United States Patent

[11] 3,619,467

[72] Inventor Daniel J. Goodman
23236 Westbury Drive, St. Clair Shores, Mich. 48080
[21] Appl. No. 31,201
[22] Filed Apr. 23, 1970
[45] Patented Nov. 9, 1971

[54] ELECTRIC ARC FURNACE AND METHOD OF PROTECTING THE REFRACTORY LINING THEREOF
12 Claims, 3 Drawing Figs.

[52] U.S. Cl. .................................................. 13/35
[51] Int. Cl. .................................................. F27d 1/00
[50] Field of Search .......................................... 13/35, 9

[56] References Cited
UNITED STATES PATENTS
3,190,626 6/1965 Schwabe et al. ............... 13/35 X
3,213,178 10/1965 Ovrom Sem .................... 13/9 X

*Primary Examiner*—Bernard A. Gilheany
*Assistant Examiner*—R. N. Envall, Jr.
*Attorney*—Barthel & Bugbee ABSTRACT: Damage to the lining of the shell of an electric arc furnace by arc flare during steel making is reduced by providing a powerful magnetic field in the vicinity of the lining sidewall area subjected to the intensive heat from arc flare and then feeding pieces, pellets or fragments of magnetically attracted ferrous material, such as iron ore or metal pieces, pellets or fragments past the magnetized lining area to the molten metal and slag bath in the bottom or hearth of the furnace. This magnetic flux causes the falling fragments, such as concentrated iron ore pellets, to be captured by and to adhere temporarily to the lining of the furnace until their temperatures reach the so-called Curie point of about 700° C. at which their capability of being magnetically attracted ceases. Thereupon the pellets fall into the molten bath but are immediately replaced by fresh pellets falling past the magnetized wall and thus providing a continuous shield of pellets or other magnetizable fragments which provide substantial protection to the sidewalls or lining of the furnace. The portions of the furnace between the electromagnets providing the magnetic flux and the furnace lining at the locations subjected to damaging arc flare are preferably formed of nonmagnetic material, so as to maintain the magnetix flux flow through the furnace wall and lining at its maximum value.

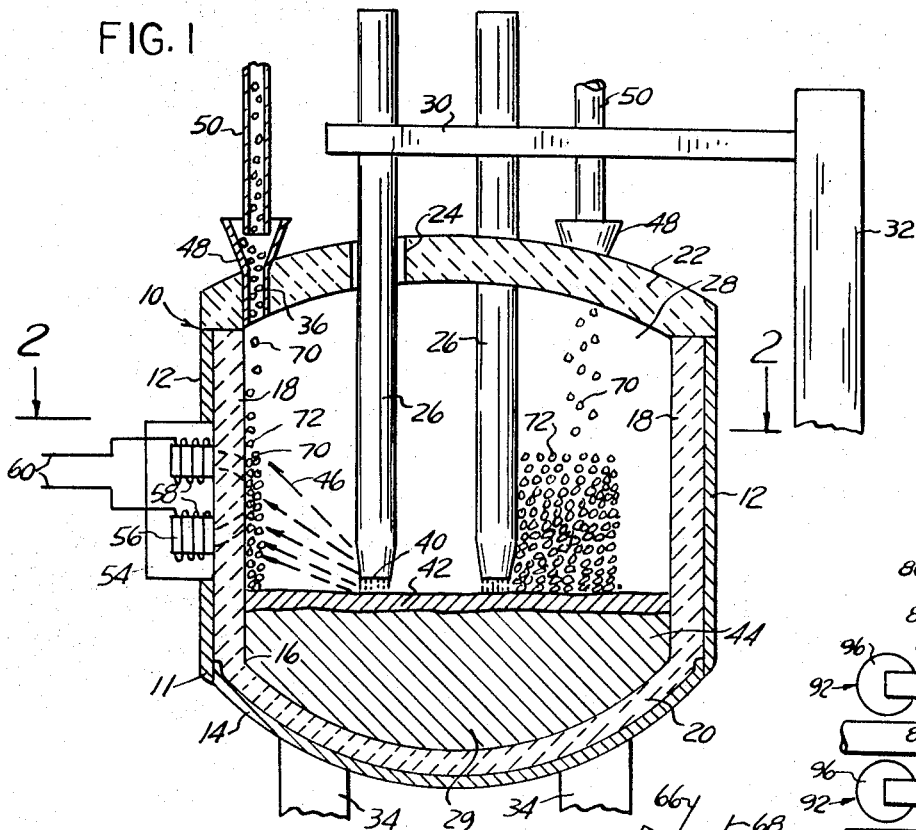

ELECTRIC ARC FURNACE AND METHOD OF PROTECTING THE REFRACTORY LINING THEREOF

In the drawings,

FIG. 1 is a diagrammatic central vertical section through an electric arc steel-making furnace, according to one form of the invention, with the electric arc flare shown by dashed lines in the flare zone from the lower end portions of the electrodes;

FIG. 2 is a horizontal section taken along the line 2—2 in FIG. 1; and

FIG. 3 is a fragmentary vertical section similar to the left-hand side of FIG. 1, but taken through a conventional steel-making furnace fired by fossil fuel and showing the magnet arrangements as applied to a nonelectric arc furnace.

Referring to the drawing in detail, FIGS. 1 and 2 show an electric arc Steelmaking furnace, generally designated 10, according to one form of the invention, wherein the furnace 10 has an external steel shell 11 including a cylindrical sidewall 12 and a bottom wall 14. The furnace 10 is provided with a refractory lining 16 having a sidewall portion 18 and a bottom wall portion 20. The sidewall 12 and bottom wall 14 are ordinarily of steel. A cover or roof 22 also of heat-resistant refractory material or refractory-lined material is removably mounted on the top of the furnace 10 and is provided with circumferentially spaced openings 24, preferably three in number, through which electrodes 26 project downward into the internal chamber 28 of the furnace 10 toward the hearth 29 in the lower portion thereof. The electrodes 26 are also preferably three in number (FIG. 2) and are individually attached to arms 30 extending horizontally to a vertical mast 32 (only one arm and one mast being shown in FIG. 1). The arms 30 together with their respective electrodes 26 may be raised and lowered by conventional hydraulic pistons and cylinders (not shown) attached to their respective masts 32. The cover or roof 22 is also provided with conventional raising, lowering and swinging mechanism likewise connected to a mast (not shown), such features being well known to those skilled in the steel-making art and hence requiring no description. Connected to each electrode 26 is a conventional cable (not shown) generally of water-cooled construction and running to a conventional three-phase arc furnace transformer (also not shown). The furnace 10 is supported on pillars 34 extending downward from the bottom wall 14 thereof.

Also formed in the roof 22 adjacent the sidewall portions 18 of the furnace lining 16 are three circumferentially spaced vertical bores 36 spaced radially away from the electrodes 26 in approximately the midportion of the sector-shaped flare zone 38 (FIG. 2) which extends from each electrode 26 to the sidewall portion 18 of the furnace lining 16. This flare zone is so called because of the fact that during the operation of the furnace 10 an electric arc extending from the lower ends 40 of the electrodes 26 to the slag layer 42 and molten steel bath 44 also emits intense heat indicated by arrows 46 in FIG. 1, by radiation and convection, which falls most damagingly upon the nearest portions of the sidewall lining portion 18. Mounted in each bore 36 is a pellet feed funnel 48 above which is a pellet feed conduit 50 communicating with a pellet hopper (not shown) which in turn is continuously supplied with iron ore pellets or fragments of ferrous metal during operation, such as by a suitable conventional conveyor (not shown).

Arranged adjacent the furnace sidewall 12 in line with the flare zone 38 from each electrode 26 is a powerful electromagnet 52. Each electromagnet 52 has an arcuate iron core 54 provided with pole pieces 56, each having a winding 58 connected to flexible conductors 60 and 62. In the area of the furnace sidewall 12 spaced by each electromagnet 52, the sidewall 12 is preferably cut away so that the magnetic flux from the poles 56 extends most powerfully through the nonmagnetic refractory sidewall lining 18 without being seriously diverted. In order to control the strength of the magnetic flux, conventional electric power current controllers 64 are interposed between the electric conductors 60 and 62 and the electric power lines 66 and 68 leading to a source of electric power current (not shown).

In the operation of the furnace 10 (FIGS. 1 and 2), electrodes 26 and the roof 22 are swung to one side temporarily while a charge of scrap ferrous metal is inserted in the bottom of the chamber 28 above the hearth 29. The roof 22 and electrodes 26 are then swung back into their operating positions and the electrodes 26 lowered until their lower ends 40 lie adjacent the charge in the hearth 29 of the furnace 10. Electric current is then caused to flow through the electrodes 26 from the transformer (not shown), causing arcs to be struck between the electrodes 26 and the charge in the furnace 10. At the same time, electric current is supplied through the lines 60 to the magnets 52. The intense heat emitted from these arcs reduces the furnace charge to a molten state in which a layer of slag 42 from impurities in the charge floats upon the molten steel bath 44. A part of this heat from the arcs is reflected off the surface of the slag layer 42, but the ferrous material layer 72 formed by the ferrous metal pieces 70 magnetically held against the refractory lining 18 protects that lining in the manner described below.

Meanwhile, intense heat is also radiated sidewise from the lower end portions 40 of the electrodes 26 toward the sidewall portion 18 within the flare zone 38, its intensity decreasing as the distance to the lining 18 increases. Meanwhile, however, the operator delivers pieces 70 of magnetically attracted ferrous material, such as ferrous metal particles or fragments or ferrous ore pellets to the conduits 50 to the feed funnels 48, whence they fall in a shower past the sidewall lining portions 18 within the flare zone 38. Here they are captured by the intense magnetic flux flowing through the sidewall lining portion 18 and are caused to temporarily adhere thereto. The pieces 70 thus collectively form a temporary protective layer 72 or shield which receives the high-intensity arc radiation within the flare zone 38 from the electrodes 26. When the ferrous material pieces 70 are heated to a temperature corresponding to the so-called Curie point of about 700° C., they lose their capability of being magnetically attracted and drop through the slag layer 42 into the molten steel bath 44, adding their volume thereto.

As rapidly as the pieces 70 drop into the molten steel bath 44, however, they are replaced by other pieces 70 falling from the feed funnels 48. These pieces 70 in turn adhere temporarily to the sidewall lining portions 18 until they too are heated to the Curie point and drop into the molten steel bath 44. The shielding afforded by the layers 72 of the pieces 70 is thus continuous as long as the furnace is in operation, and provides satisfactory protection to the refractory sidewall lining 18. As a result, the working life of the lining 18 is greatly extended, the down time of the furnace 10 effectively reduced, and the expense of maintaining the lining 16 in a satisfactory condition is accordingly reduced.

In the modification shown in FIG. 3, a steel-making furnace 80 is fired by fossil fuel extending through holes 84 and 86 in the shell 88 and refractory lining 90. Vertically spaced electromagnets 92 mounted on the furnace 80 and having pole pieces 94 extending through the furnace shell 88 to the refractory lining 90 are energized by windings 96 likewise connected to a suitable source of electric current by way of current controllers as shown in FIGS. 1 and 2.

In the operation of the furnace 80, let it be assumed as before that a charge of ferrous material has been placed in the furnace 80 and reduced to a molten condition by the flame blast impinging thereon from the nozzles 72, which are ordinarily fired by natural gas. Electric current, as before, is supplied to the windings 86 of the electromagnets 82 while ferrous material pieces 98 are fed downward past the magnetic flux from the pole pieces 84 of the electromagnets 82 and are thereby caused to form an adherent protective layer 100 of ferrous material against the refractory lining 90 of the furnace 80. This layer 100 provides satisfactory protection to the refractory lining 90 and shields it from the heat emitted by the flames from the burners 72. When it is desired to change the layers 100 before they melt or are demagnetized and fall of their own accord, the operator shuts off the current from the windings 86 of the electromagnets 82, causing the ferrous material pieces 98 to fall under the force of gravity.

It will be understood that the term "pieces of ferrous material" as used in the claims herein includes prereduced ferrous ore in the form of pellets, briquettes or lumps, and also includes fragmentized scrap as a full or partial substitution for conventional scrap. It will also be understood that the ferrous metal pieces, rather than being fed through holes in the roof of the furnace may, in the alternative, be fed through holes in the sidewall of the furnace, or blown through such holes or slots.

It will be understood that other types of protection may be provided in place of the refractory lining, for example, high-temperature resistant linings of nonrefractory material cooled by water, refrigeration or other coolants, wherein the protective lining is subject to the passage of magnetic flux which will also cause the ferrous material pieces to adhere to the lining and thereby protect the lining and the furnace shell or outer wall. It will be still further understood that the invention as set forth in the following claims is also applicable to foundry iron furnaces and to basic oxygen furnaces known as "B.O.F." vessels or converters, and is not confined solely to the protection of the linings of electric arc steel-making furnaces.

I claim:

1. A refractory-protecting electric arc steel-making furnace, comprising
   a steel-making furnace structure including an outer shell and a refractory lining therein defining a steel-making chamber,
   said lining including a sidewall portion,
   an electrode-supporting structure disposed adjacent said furnace structure,
   electrodes extending downward from said structure into said chamber,
      said electrodes when energized emitting electric heat-generating arcs extending downward to the ferrous material charge in said chamber and also emitting laterally extending heat flare against flare-zone areas on said sidewall portion of said lining nearest said electrodes,
   means for generating magnetic flux extending through said flare-zone areas of said refractory lining,
   and means for feeding pieces of ferrous material to said furnace chamber in proximity to said magnetized flare-zone areas of said refractory lining and thereby effecting temporary adherence of said pieces to said refractory lining.

2. A refractory-protecting electric arc steel-making furnace, according to claim 1, wherein a furnace roof is removably mounted on said furnace structure, and wherein said feeding means is installed in said roof.

3. A refractory-protecting electric arc steel-making furnace, according to claim 1, wherein said magnetic flux-generating means includes electromagnets having magnetic poles disposed adjacent said sidewall portion of said refractory lining, and also includes magnet windings adapted to be connected to a source of electric power current.

4. A refractory-protecting electric arc steel-making furnace, according to claim 3, wherein said electromagnets are disposed adjacent said flare-zone areas of said sidewall portion of said refractory lining.

5. A refractory-protecting electric arc steel-making furnace, according to claim 1, wherein said furnace structure shell has openings therein adjacent said flare-zone areas of said refractory lining and wherein said poles of said electromagnets extend through said openings and adjacent said refractory lining.

6. A refractory-protecting electric arc steel-making furnace, according to claim 2, wherein said roof has bores therein disposed adjacent the periphery thereof, and wherein said feeding means includes conduits extending through said bores adjacent said sidewall portion of said refractory lining above said flare zones thereof.

7. A refractory-protecting electric arc steel-making furnace, according to claim 3, wherein means is provided for adjusting the intensity of magnetic flux emitted by said electromagnets.

8. A method of protecting the flare-zone areas of the refractory sidewall lining of an electric arc steel-making furnace containing a steel- making charge heated by flare-emitting electrodes, said method comprising
   - establishing magnetic flux extending through said flare-zone areas,
   and feeding pieces of ferrous material past the thus-magnetized flare-zone areas in sufficient proximity thereto to effect capture of said pieces by said magnetic flux and cause temporary adherence of said pieces to said flare-zone areas whereby to protect said flare-zone areas by the layer of ferrous material pieces adhering thereto.

9. A method, according to claim 8, including raising the temperature of said pieces past the Curie point thereof to effect demagnetization thereof and cause dropping thereof into the charge in said furnace.

10. A method, according to claim 9, including feeding fresh ferrous material pieces to the flare-zone areas to replace the heat-demagnetized pieces dislodged therefrom.

11. A heat-resistant lining-protecting melting furnace for ferrous materials, comprising
   a ferrous material melting furnace structure including an outer shell and a heat-resistant protective lining therein defining a melting chamber,
   heating means associated with said furnace structure and constructed and arranged to project heat onto a ferrous material charge in said chamber and melt said charge,
   means for generating magnetic flux extending through said protective lining into said chamber,
   and means for feeding ferrous material pieces to said furnace chamber through the path of the magnetic flux flowing through said protective lining and thereby effecting temporary adherence of said pieces to said protective lining.

12. A heat-resistant lining-protecting melting furnace for ferrous materials, according to claim 11, wherein said magnetic flux-generating means includes electromagnets having magnetic poles disposed adjacent said sidewall portion of said protective lining and also includes magnet windings adapted to be connected to a source of electric power current and further includes electric current controlling means interposed between said magnet windings and the source of electric power current for varying the strength of the magnetic flux.

* * * * *